(12) United States Patent
Kwon et al.

(10) Patent No.: US 12,132,224 B2
(45) Date of Patent: Oct. 29, 2024

(54) SEPARATOR FOR ELECTROCHEMICAL DEVICE AND METHOD FOR MANUFACTURING THE SAME

(71) Applicant: LG ENERGY SOLUTION, LTD., Seoul (KR)

(72) Inventors: Hye-Jin Kwon, Daejeon (KR); Myeong-Soo Kim, Daejeon (KR); Su-Jin Yoon, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 516 days.

(21) Appl. No.: 17/437,932

(22) PCT Filed: Mar. 20, 2020

(86) PCT No.: PCT/KR2020/003898
§ 371 (c)(1),
(2) Date: Sep. 10, 2021

(87) PCT Pub. No.: WO2020/190101
PCT Pub. Date: Sep. 24, 2020

(65) Prior Publication Data
US 2022/0149480 A1 May 12, 2022

(30) Foreign Application Priority Data
Mar. 21, 2019 (KR) .......................... 10-2019-0032424

(51) Int. Cl.
| | |
|---|---|
| H01M 50/403 | (2021.01) |
| H01M 50/409 | (2021.01) |
| H01M 50/414 | (2021.01) |
| H01M 50/446 | (2021.01) |
| H01M 50/449 | (2021.01) |
| H01M 50/489 | (2021.01) |
| H01M 50/491 | (2021.01) |

(52) U.S. Cl.
CPC ....... *H01M 50/403* (2021.01); *H01M 50/409* (2021.01); *H01M 50/414* (2021.01); *H01M 50/446* (2021.01); *H01M 50/449* (2021.01); *H01M 50/489* (2021.01); *H01M 50/491* (2021.01)

(58) Field of Classification Search
None
See application file for complete search history.

(56) References Cited

U.S. PATENT DOCUMENTS

| | | | |
|---|---|---|---|
| 2007/0009803 A1 | 1/2007 | Kim et al. | |
| 2007/0184340 A1 | 8/2007 | Ichikawa et al. | |
| 2010/0203396 A1 | 8/2010 | Murata | |
| 2010/0316803 A1 | 12/2010 | Kim et al. | |
| 2010/0325877 A1* | 12/2010 | Murata .................. | H01M 50/46 429/145 |
| 2013/0331522 A1 | 12/2013 | Jeon et al. | |
| 2014/0186680 A1 | 7/2014 | Kim et al. | |
| 2015/0030933 A1 | 1/2015 | Goetzen et al. | |
| 2016/0190536 A1 | 6/2016 | Park et al. | |
| 2016/0285063 A1* | 9/2016 | Yang .................. | H01M 50/451 |
| 2017/0133653 A1 | 5/2017 | Lee et al. | |
| 2018/0212219 A1* | 7/2018 | Kim .................... | H01M 50/411 |
| 2018/0337381 A1 | 11/2018 | Seo et al. | |
| 2019/0355953 A1 | 11/2019 | Nam et al. | |

FOREIGN PATENT DOCUMENTS

| | | |
|---|---|---|
| CN | 101874319 A | 10/2010 |
| CN | 105742546 A | 7/2016 |
| CN | 105932203 A | 9/2016 |
| CN | 108960930 A | 7/2017 |
| CN | 107895766 A | 4/2018 |
| EP | 2 549 564 A2 | 1/2013 |
| JP | 3371839 B2 | 1/2003 |
| JP | 6225119 B2 | 11/2017 |
| KR | 10-2007-0005341 A | 1/2007 |
| KR | 10-2009-0130885 A | 12/2009 |
| KR | 10-1025187 B1 | 3/2011 |
| KR | 10-2012-0108686 A | 10/2012 |
| KR | 10-2013-0129148 A | 11/2013 |
| KR | 10-2014-0044757 A | 4/2014 |
| KR | 10-2016-0128726 A | 11/2016 |
| KR | 10-2017-0025434 A | 3/2017 |
| KR | 10-2017-0053448 A | 5/2017 |

(Continued)

OTHER PUBLICATIONS

Pan et al. "Tannic-Acid-Coated Polypropylene Membrane as Separator for Lithium-Ion Batteries" ACS Appl. Mater. Interfaces 2015, 7, 16003-1610. (Year: 2015).*
International Search Report for PCT/KR2020/003898 mailed on Jul. 17, 2020.
European Patent Office Search Report dated Apr. 7, 2022 for corresponding EP Application No. 20773459.1.

*Primary Examiner* — Lisa S Park
(74) *Attorney, Agent, or Firm* — Birch, Stewart, Kolasch & Birch, LLP

(57) ABSTRACT

A separator for an electrochemical device. The separator includes a porous coating layer formed from an acid, which is crosslinkable. As a result, the separator has increased heat resistance, safety and physical strength, shows improved peel strength between the porous substrate and the porous coating layer, and prevents separation of the inorganic particles from the porous coating layer. In addition, the separator shows an improved crosslinking degree so that the added amount of a crosslinkable binder resin may be reduced. Thus, it is possible to increase the added amount of a non-crosslinkable resin, inorganic particles, or both. Even when using a small amount of a crosslinkable binder resin, it is possible to provide both an effect of improving heat resistance and an effect of improving adhesion.

12 Claims, No Drawings

(56) References Cited

FOREIGN PATENT DOCUMENTS

| | | |
|---|---|---|
| KR | 10-2017-0061853 A | 6/2017 |
| KR | 10-2017-0129642 A | 11/2017 |
| KR | 10-2018-0081472 A | 7/2018 |
| KR | 10-1880237 B1 | 8/2018 |
| KR | 10-2018-0110375 A | 10/2018 |
| KR | 10-2019-0006586 A | 1/2019 |

* cited by examiner

SEPARATOR FOR ELECTROCHEMICAL DEVICE AND METHOD FOR MANUFACTURING THE SAME

TECHNICAL FIELD

The present application claims priority to Korean Patent Application No. 10-2019-0032424 filed on Mar. 21, 2019 in the Republic of Korea. The present disclosure relates to a separator for an electrochemical device, such as a lithium secondary battery, and a method for manufacturing the same. More particularly, the separator includes a porous coating layer comprising a crosslinked polymer which is disposed on the surface of a porous substrate.

BACKGROUND ART

Recently, energy storage technology has been given an increasing attention. Efforts into research and development for electrochemical devices have been actualized more and more, as the application of energy storage technology has been extended to energy for cellular phones, camcorders and notebook PC and even to energy for electric vehicles. In this context, electrochemical devices have been most spotlighted. Among such electrochemical devices, development of rechargeable secondary batteries has been focused. More recently, active studies have been conducted about designing a novel electrode and battery in order to improve the capacity density and specific energy in developing such batteries.

Among the commercially available secondary batteries, lithium secondary batteries developed in the early 1990's have been spotlighted, since they have a higher operating voltage and significantly higher energy density as compared to conventional batteries, such as Ni-MH, Ni—Cd and sulfuric acid-lead batteries using an aqueous electrolyte. However, such lithium ion batteries have a safety-related problem, such as ignition and explosion, caused by the use of an organic electrolyte and requires a complicated manufacturing process undesirably.

Although such electrochemical devices have been produced from many production companies, safety characteristics thereof show different signs. Evaluation and securement of safety of such electrochemical devices are very important. The most important consideration is that electrochemical devices should not damage users upon their malfunction. For this purpose, safety standards strictly control ignition and smoke emission in electrochemical devices. With regard to safety characteristics of electrochemical devices, there is great concern about explosion when an electrochemical device is overheated to cause thermal runaway or perforation of a separator. Particularly, a polyolefin-based porous substrate used conventionally as a separator for an electrochemical device shows a severe heat shrinking behavior at a temperature of 100° C. or higher due to its material property and a characteristic during its manufacturing process, including orientation, thereby causing a short-circuit between a cathode and an anode.

To solve the above-mentioned safety problems of an electrochemical device, Korean Laid-Open Patent No. 10-2009-0130885 discloses a multilayer porous membrane structure which has a porous layer including a filler material, such as inorganic particles, due to polymethacrylate-co-acrylate being used as a binder. However, the binder having the acrylic copolymer composition disclosed in the above patent document could not suggest a practical alternative. Particularly, when using the above-mentioned composition, the battery shows low thermal and physical stability in the case of coating with 4 μm or less on the coating sectional thickness basis, thereby causing a problem in that it is difficult to ensure durability and reliability.

Therefore, there is a need for providing a novel separator which prevents or inhibits ignition in an electrochemical battery, particularly in a middle- to large-capacity battery, provides improved stability, including heat resistance, and improves or maintains the proper quality of a battery.

DISCLOSURE

Technical Problem

The present disclosure is designed to solve the problems of the related art, and therefore the present disclosure is directed to providing a separator having excellent heat resistance and adhesion, and a method for manufacturing the same. The present disclosure is also directed to providing an electrochemical device including the separator. These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

The present disclosure is designed to solve the problems of the related art, and provides a method for manufacturing a separator for an electrochemical device, and a separator obtained by the method.

According to the first embodiment of the present disclosure, there is provided a method for manufacturing a separator for an electrochemical device, including the steps of: (S1) preparing a porous substrate; (S2) preparing a composition for forming a porous coating layer; (S3) coating the composition for forming a porous coating layer onto at least one surface of the porous substrate to produce a coated porous substrate; and (S4) introducing the coated porous substrate obtained from step (S3) to a crosslinking process, wherein the composition for forming a porous coating layer includes a crosslinkable binder resin, a non-crosslinkable binder resin, a crosslinking agent and an acid.

According to the second embodiment of the present disclosure, there is provided the method for manufacturing a separator for an electrochemical device as defined in the first embodiment, wherein the crosslinkable binder resin includes a repeating unit derived from an acrylate monomer having a crosslinkable functional group.

According to the third embodiment of the present disclosure, there is provided the method for manufacturing a separator for an electrochemical device as defined in the second embodiment, wherein the crosslinkable functional group includes a hydroxyl (OH) group, carboxyl group, or both.

According to the fourth embodiment of the present disclosure, there is provided the method for manufacturing a separator for an electrochemical device as defined in the second or the third embodiment, wherein the repeating unit includes 2-hydroxyethyl(meth) acrylate, 3-hydroxypropyl (meth) acrylate, 4-hydroxybutyl(meth) acrylate, 2-hydroxyethylene glycol(meth) acrylate, 3-hydroxypropylene glycol (meth) acrylate, or two or more of them.

According to the fifth embodiment of the present disclosure, there is provided the method for manufacturing a separator for an electrochemical device as defined in any one of the first to the fourth embodiments, wherein the non-crosslinkable binder resin includes a PVdF-based copolymer containing a repeating unit derived from vinylidene fluoride monomer.

According to the sixth embodiment of the present disclosure, there is provided the method for manufacturing a separator for an electrochemical device as defined in any one of the first to the fifth embodiments, wherein the acid has a molecular weight (Mw) of 1,000 g/mol to 10,000 g/mol, and an OH content of 25 wt % or more.

According to the seventh embodiment of the present disclosure, there is provided the method for manufacturing a separator for an electrochemical device as defined in any one of the first to the sixth embodiments, wherein the acid is present in an amount of 16 wt % to 60 wt % based on 100 wt % of the mixture of the crosslinkable binder resin with acid.

According to the eighth embodiment of the present disclosure, there is provided the method for manufacturing a separator for an electrochemical device as defined in any one of the first to the seventh embodiments, wherein the content of the crosslinkable binder resin is 10 wt % to 30 wt % based on 100 wt % of the total binder resin present in the composition for forming a porous coating layer.

According to the ninth embodiment of the present disclosure, there is provided the method for manufacturing a separator for an electrochemical device as defined in any one of the first to the eighth embodiments, wherein the crosslinking agent includes an isocyanate-based crosslinking agent.

According to the tenth embodiment of the present disclosure, there is provided a separator for an electrochemical device obtained by the method as defined in any one of the first to the ninth embodiments, the separator for an electrochemical device including a porous substrate and a porous coating layer formed on at least one surface of the porous substrate, wherein the porous coating layer includes inorganic particles, a crosslinkable binder resin and a non-crosslinkable binder resin, the crosslinkable binder resin is maintained in a state crosslinked by a crosslinking agent, and the crosslinking agent is bound to an acid-derived compound.

According to the eleventh embodiment of the present disclosure, there is provided the separator for an electrochemical device as defined in the tenth embodiment, wherein the acid-derived compound forms hydrogen bonds with the inorganic particles and/or the porous substrate.

According to the twelfth embodiment of the present disclosure, there is provided the separator for an electrochemical device as defined in the tenth or the eleventh embodiment, wherein the acid has a molecular weight (Mw) of 1,000 g/mol to 10,000 g/mol, and an OH content of 25 wt % or more.

According to the thirteenth embodiment of the present disclosure, there is provided an electrochemical device including a negative electrode, a positive electrode and a separator interposed between the positive electrode and the negative electrode, wherein the separator is the separator for the electrochemical device as defined in any one of the tenth to the twelfth embodiments.

Advantageous Effects

The separator according to the present disclosure provides the following effects.

1. Crosslinking of the binder polymer provides increased heat resistance, safety and physical strength.

2. The OH group-containing acid participates in the crosslinking to increase crosslinking sites, thereby providing a high crosslinking degree.

3. Addition of the acid improves the binding force with the porous substrate and inorganic particles to improve the peel strength between the porous substrate and the porous coating layer and to prevent separation of the inorganic particles in the porous coating layer.

4. Such an improved crosslinking degree can reduce the added amount of the crosslinkable binder resin, resulting in an increase in added amount of the non-crosslinkable binder resin, inorganic particles or both. In other words, even when using a small amount of crosslinkable binder resin, it is possible to provide both of an effect of improving heat resistance and an effect of improving adhesion.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

Throughout the specification, the expression 'a part ⌜includes⌝ an element' does not preclude the presence of any additional elements but means that the part may further include the other elements.

As used herein, the terms 'approximately', 'substantially', or the like, are used as meaning contiguous from or to the stated numerical value, when an acceptable preparation and material error unique to the stated meaning is suggested, and are used for the purpose of preventing an unconscientious invader from unduly using the stated disclosure including an accurate or absolute numerical value provided to help understanding of the present disclosure.

As used herein, the expression 'A and/or B' means 'A, B or both of them'.

Specific terms used in the following description are for illustrative purposes and are not limiting. Such terms as 'right', 'left', 'top surface' and 'bottom surface' show the directions in the drawings to which they are referred. Such terms as 'inwardly' and 'outwardly' show the direction toward the geometrical center of the corresponding apparatus, system and members thereof and the direction away from the same, respectively. 'Front', 'rear', 'top' and 'bottom' and related words and expressions show the positions and points in the drawings to which they are referred and should not be limiting. Such terms include the above-listed words, derivatives thereof and words having similar meanings.

The present disclosure relates to a separator for an electrochemical device and a method for manufacturing the same. The present disclosure also relates to an electrochemical device including the separator. According to an embodiment of the present disclosure, the electrochemical device means a device converting chemical energy into electrical energy by electrochemical reactions. In addition, particular examples of the electrochemical device include any types of primary batteries, secondary batteries, fuel cells, solar cells or capacitors, such as super-capacitor devices. According to an embodiment of the present disclosure, the secondary batteries include lithium ion batteries, lithium metal batteries, lithium polymer batteries, nickel-hydrogen batteries, metal-air batteries, nickel-metal hydride (Ni-MH) batteries, nickel-cadmium batteries, lead-acid batteries, or the like, but are not limited thereto.

The separator according to an embodiment of the present disclosure includes a porous substrate including a plurality of pores, and a porous coating layer formed on at least one surface of the porous substrate.

According to an embodiment of the present disclosure, the separator may have a thickness of 5-20 μm and the thickness may be controlled suitably within the above-defined range. For example, the separator may have a thickness of 18 μm or less, or 15 μm or less. In addition, the separator may have an air permeability of about 38-60 vol %.

As used herein, the term 'air permeability' means a time required for 100 cc of air to pass through an object, such as a separator or porous substrate, to be tested for permeability, is expressed in the unit of second/100 cc, may be used exchangeably with 'transmission', and is generally represented by Gurley value, or the like. According to an embodiment of the present disclosure, the permeability may be determined according to JIS P8117. In addition, air permeability P1 determined for an object having a thickness of T1 may be converted into air permeability P2 of the object having a thickness of 20 μm according to the mathematical formula of P2=(P1×20)/T1.

According to an embodiment of the present disclosure, the separator preferably has a heat shrinkage of 30% or less. Heat shrinkage refers to a degree of downsizing of a separator after it is allowed to stand at a temperature of about 150° C. for 30 minutes, is expressed as percentage of the downsized area based on the initial area of the separator, and may be calculated according to the following (Formula 1).

Heat shrinkage (%)={$(A-A')/A$}×100,     (Formula 1)

wherein A represents the initial area of a separator, and A' represents the area of the separator after downsizing.

According to an embodiment of the present disclosure, the separator preferably shows a peel strength of 100 gf/15 mm or more between the porous substrate and the porous coating layer. According to an embodiment of the present disclosure, the peel strength is determined as binding force between the porous substrate and the porous coating layer, and may be measured by using a UTM instrument (LLOYD Instrument LF Plus), or the like.

The porous substrate means a porous ion-conducting barrier which allows ions to pass therethrough while interrupting an electrical contact between a negative electrode and a positive electrode, and has a plurality of pores formed therein. The pores are interconnected so that gases or liquids may pass from one surface of the substrate to the other surface of the substrate.

Materials forming the porous substrate may be any organic materials or inorganic materials having electrical insulation property. Particularly, with a view to imparting a shut-down function to a substrate, an organic material, such as a polymer resin, may be used as a material for forming the substrate, and it is preferred to use a thermoplastic resin. Herein, the term 'shut-down function' means a function of preventing thermal runaway of a battery by allowing a thermoplastic resin to be molten so that the pores of the porous substrate may be closed and ion conduction may be interrupted, when the battery temperature is increased. As a thermoplastic resin, a thermoplastic resin having a melting point less than 200° C. is suitable, polyolefin being particularly preferred.

In addition to polyolefin, the thermoplastic resin may further include at least one polymer resin selected from polyethylene terephthalate, polybutylene terephthalate, polyacetal, polyamide, polycarbonate, polyimide, polyetherether ketone, polyether sulfone, polyphenylene oxide, polyphenylene sulfide and polyethylene naphthalene.

Particular examples of the porous substrate include a nonwoven web or porous polymer film, or a laminate of two or more of them, but are not limited thereto.

According to an embodiment of the present disclosure, the porous substrate preferably has a thickness of 3-12 μm, or 5-12 μm. When the thickness is smaller than the above-defined range, it is not possible to obtain a function as a conductive barrier sufficiently. On the other hand, when the thickness is excessively larger than the above-defined range (i.e. the porous polymer substrate is excessively thick), the separator may show excessively increased resistance.

According to an embodiment of the present disclosure, the porous polymer substrate may be any porous polymer substrate, as long as it is a planar porous polymer substrate used for an electrochemical device. For example, an insulating thin film showing high ion permeability and mechanical strength and generally having a pore diameter of 10-100 nm and a thickness of 5-12 μm may be used.

According to the present disclosure, the separator includes a porous coating layer disposed on at least one surface of the porous substrate. The porous coating layer includes a mixture containing a binder resin and inorganic particles. In addition, the inorganic particles are closely packed in the porous coating layer and the porous coating layer may have a plurality of micropores derived from the interstitial volumes formed among the inorganic particles. The micropores are interconnected to provide a porous structure which allows gases or liquids to pass from one surface to the other surface. According to an embodiment of the present disclosure, the inorganic particles are totally or partially surface-coated with the binder resin and are bound to one another in a face-to-face or dot-to-dot manner by means of the binder resin. According to an embodiment of the present disclosure, the porous coating layer may include the binder resin and inorganic particles at a weight ratio of 5:95-50:50.

Meanwhile, according to an embodiment of the present disclosure, the porous coating layer may have an adhesive portion with a high content of binder resin on the surface thereof. As described hereinafter, the porous coating layer in the separator according to the present disclosure may include a PVdF-based binder resin as a binder resin, and slurry for forming a porous coating layer may be dried under a humidified condition, when forming the porous coating layer. In this case, the PVdF-based binder resin migrates toward the surface portion of the porous coating layer while the solvent is dried, and thus the surface portion of the porous coating layer may have a relatively higher content of PVdF-based binder resin as compared to the other portions.

According to an embodiment of the present disclosure, the binder resin includes a crosslinkable binder resin and a non-crosslinkable binder resin, wherein the crosslinkable binder resin maintains a crosslinked state in the porous coating layer. In other words, the porous coating layer may be derived from a composition for forming a porous coating layer including a crosslinkable binder resin and a non-crosslinkable binder resin, and the crosslinkable binder resin may be crosslinked by carrying out a crosslinking step during the manufacture of the separator.

The crosslinkable binder resin that may be used includes an acrylic copolymer. The acrylic copolymer may include a repeating unit derived from an alkyl acrylate monomer, a repeating unit derived from an acrylate monomer having a crosslinkable functional group, or both. Particular examples of the crosslinkable functional group may be a hydroxyl group (OH), carboxyl group, or both. According to an embodiment of the present disclosure, the acrylic copolymer may include, as a repeating unit, a hydroxyl group-containing (meth)acrylate, such as 2-hydroxyethyl(meth)acrylate, 3-hydroxypropyl(meth)acrylate, 4-hydroxybutyl(meth)acrylate, 2-hydroxyethylene glycol(meth)acrylate or 3-hydroxypropylene glycol (meth)acrylate, (meth)acrylate, acrylic acid, methacrylic acid, acrylic dimer, butyl (meth)acrylate, propyl (meth)acrylate, ethyl (meth)acrylate, methyl (meth) acrylate, or two or more monomers of them.

Meanwhile, according to an embodiment of the present disclosure, the non-crosslinkable binder resin may include a PVdF-based copolymer containing a repeating unit derived from vinylidene fluoride monomer. In addition, according to an embodiment of the present disclosure, the PVdF-based copolymer may include a repeating unit derived from a vinylidene fluoride-based monomer in combination with a comonomer capable of forming a copolymer with vinylidene fluoride monomer. Particular examples of the comonomer include at least one selected from hexafluoropropylene (HFP), chlorotrifluoroethylene (CTFE), tetrafluoroethylene (TFE), hexafluoroacetone (HFA), trifluoroethylene (TrFE), hexafluoroisobutylene (HFIB), perfluoropropyl vinyl ether (PPVE), perfluoroethyl vinyl ether (PEVE), or the like. More particularly, the copolymer may include at least one of polyvinylidene fluoride (PVdF), polyvinylidene fluoride-co-hexafluoropropylene (PVdF-HFP), polyvinylidene fluoride-co-chlorotrifluoroethylene (PVdF-CTFE), polyvinylidene fluoride-co-tetrafluoroethylene (PVdF-TFE), polyvinylidene fluoride-co-trifluoroethylene (PVdF-co-TrFE), or the like.

In addition, the non-crosslinkable binder resin may further include a non-crosslinkable binder resin in combination with the PVdF-based copolymer. For example, the non-crosslinkable binder resin may be an acrylic copolymer. Particular examples of the acrylic copolymer include, but are not limited to:(meth)acrylate, acrylic acid, methacrylic acid, acrylic acid dimer, butyl (meth)acrylate, propyl (meth)acrylate, ethyl (meth)acrylate, methyl (meth)acrylate, or two or more monomers of them. In combination with the acrylic copolymer or independently from the acrylic copolymer, the non-crosslinkable binder resin may include any one selected from the group consisting of styrene butadiene rubber (SBR), polytetrafluoroethylene (PTFE), polyethylene glycol (PEG), polypropylene glycol (PPG), toluene diisocyanate (TDI), polymethyl methacrylate, polyacrylonitrile, polyvinyl pyrrolidone, polyvinyl acetate, polyethylene-co-vinyl acetate, polyethylene oxide, cellulose acetate, cellulose acetate butyrate, cellulose acetate propionate, cyanoethyl pullulan, cyanoethyl polyvinyl alcohol, cyanoethyl cellulose, cyanoethyl sucrose, pullulan, carboxymethyl cellulose, acrylonitrile-styrene-butadiene copolymer and polyimide, or a mixture of two or more of them.

According to an embodiment of the present disclosure, the composition for forming a porous coating layer includes the above-described crosslinkable binder resin, non-crosslinkable binder resin, crosslinking agent, acid, inorganic particles and a solvent, and may further include additives, such as a dispersing agent, thickening agent, oxidation and/or reduction stabilizer, or the like, if necessary.

According to an embodiment of the present disclosure, the acid includes at least one OH functional group and can form urethane bonding with a multifunctional isocyanate as a crosslinking agent as described hereinafter. According to the related art, in the case of crosslinking using urethane bonding of an acrylic copolymer, OH group content in the acrylic copolymer is limited, and thus there is a problem in that crosslinking sites are limited. Thus, the present disclosure has focused on a method for increasing a crosslinking degree by adding an acid containing OH group to increase crosslinking sites. When the crosslinking degree is improved in this manner, it is possible to improve the thermal safety and physical strength of the separator. In addition, since the acid participates in crosslinking, there is an effect of improving the peel strength between the porous coating layer and the porous substrate. In addition, the binding force between the binder resin and inorganic particles is also improved, thereby providing an effect of preventing separation of the inorganic particles from the porous coating layer.

According to the present disclosure, the acid may be bound with isocyanate through urethane bonding to increase the crosslinking degree. In addition, the acid can form hydrogen bonding with the inorganic particles and/or porous substrate. As a result, the peel strength between the porous coating layer and the porous substrate may be improved and separation of the inorganic particles from the porous coating layer may be prevented. According to an embodiment of the present disclosure, the acid is chemically bound with at least one of the binder resin, inorganic particles and the porous substrate, wherein the chemical bonding may be in the form of ionic bonding, covalent bonding, hydrogen bonding or a combination thereof. For example, the binder resin in the separator may be present in a state wherein the acid-derived compound is bound covalently thereto. In addition, according to an embodiment of the present disclosure, the covalent bonding may be mediated through the crosslinking agent.

According to an embodiment of the present disclosure, the acid contains OH group and may include an organic acid, inorganic acid or both. With a view to increasing crosslinking sites, an acid having a high OH group content, such as tannic acid, aminic acid, carboxylic acid, sulfonic acid or acetic acid, is preferred. According to an embodiment of the present disclosure, the acid may be at least one selected from tannic acid, aminic acid, carboxylic acid, sulfonic acid, benzenesulfonic acid, lactic acid and acetic acid. According to an embodiment of the present disclosure, the acid may have a molecular weight of 1,000-10,000 and an OH group content of 25 wt % or more, or 30 wt % or more.

Unless otherwise stated, the term 'molecular weight' refers to weight average molecular weight (Mw) and may be expressed in the unit of g/mol. According to an embodiment of the present disclosure, the molecular weight (Mw) may be determined by using gel permeation chromatography (GPC). For example, 200 mg of a compound whose molecular weight is to be determined is diluted in 200 mL of a solvent, such as tetrahydrofuran (THF), to prepare about 1000 ppm of sample, and then, the molecular weight may be determined by using Agilent 1200 series GPC instrument at a flow rate of 1 mL/min through a refractive index (RI) detector.

The crosslinking agent may be any crosslinking agent, as long as it can perform crosslinking with the crosslinkable functional groups of the crosslinkable binder resin. Particularly, an isocyanate crosslinking agent may be used. According to an embodiment of the present disclosure, the isocyanate crosslinking agent may include hexamethylene diisocyanate, isophorone diisocyanate, methylene bis(cyclohexyl isocyanate), trimethyl hexamethylene diisocyanate, meta-tetramethylxylylene diisocyanate, cyclohexylene diisocyanate, tolylene diisocyanate, diphenylmethane-4,4-diisocyanate, phenylene diisocyanate, 4,4-methylene bisdicyclohexyl diisocyante, or two or more of them.

According to an embodiment of the present disclosure, the acid may be used in an amount of 16 wt % or more, 25 wt % or more, preferably 30 wt % or more, based on 100 wt % of the mixture of the crosslinkable binder resin with the acid. When the acid content is less than the above-defined range, it is not possible to provide an effect of increasing crosslinking sites sufficiently. Meanwhile, considering phase stability of slurry, the acid content may be 60 wt % or less, preferably.

According to an embodiment of the present disclosure, the content of the crosslinkable binder resin may be 10-30 wt % based on 100 wt % of the total binder resins. When the content of the crosslinkable binder resin is excessively large, the peel strength between the porous coating layer and the porous substrate may be degraded. On the other hand, when the content of the crosslinkable binder resin is excessively small, heat resistance may be degraded. Thus, the content of the crosslinkable binder resin may be controlled suitably within the above-defined range considering the peel strength and heat resistance.

According to an embodiment of the present disclosure, there is no particular limitation in the inorganic particles, as long as they are electrochemically stable. In other words, there is no particular limitation in the inorganic particles that may be used herein, as long as they cause no oxidation and/or reduction in the range (e.g. 0-5V based on Li/Li$^+$) of operating voltage of an applicable electrochemical device. Particularly, when using inorganic particles having a high dielectric constant as the inorganic particles, it is possible to improve the ion conductivity of an electrolyte by increasing the dissociation degree of an electrolyte salt, such as a lithium salt, in a liquid electrolyte.

For the above-mentioned reasons, the inorganic particles may be high-dielectric constant inorganic particles having a dielectric constant of 5 or more, preferably 10 or more. Non-limiting examples of the inorganic particles having a dielectric constant of 5 or more may include $BaTiO_3$, $Pb(Zr,Ti)O_3$ (PZT), $Pb_{1-x}La_xZr_{1-y}Ti_yO_3$(PLZT, wherein $0<x<1$, $0<y<1$), $Pb(Mg_{1/3}Nb_{2/3})O_3$—$PbTiO_3$(PMN—PT), hafnia ($HfO_2$), $SrTiO_3$, $SnO_2$, $CeO_2$, MgO, NiO, CaO, ZnO, $ZrO_2$, $SiO_2$, $Y_2O_3$, $Al_2O_3$, SiC, $TiO_2$, or a mixture thereof.

In addition, as inorganic particles, it is possible to use inorganic particles having lithium ion transportability, i.e. inorganic particles which contain lithium elements and do not store lithium but transport lithium ions. Non-limiting examples of the inorganic particles having lithium ion transportability include lithium phosphate ($Li_3PO_4$), lithium titanium phosphate ($Li_xTi_y(PO_4)_3$, $0<x<2, 0<y<3$), lithium aluminum titanium phosphate ($Li_xAl_yTi_z(PO_4)_3$, $0<x<2$, $0<y<1, 0<z<3$), $(LiAlTiP)_xO_y$-based glass ($0<x<4, 0<y<13$), such as $14Li_2O-9Al_2O_3-38TiO_2-39P_2O_5$, lithium lanthanum titanate ($Li_xLa_yTiO_3$, $0<x<2$, $0<y<3$), lithium germanium thiophosphate ($Li_xGe_yP_zS_w$, $0<x<4, 0<y<1, 0<z<1, 0<w<5$), such as $Li_{3.25}Ge_{0.25}P_{0.75}S_4$, lithium nitride ($Li_xN_y$, $0<x<4$, $0<y<2$), such as $Li_3N$, $SiS_2$-based glass ($Li_xSi_yS_z$, $0<x<3$, $0<y<2, 0<z<4$), such as $Li_3PO_4-Li_2S-SiS_2$, $P_2S_5$-based glass ($Li_xP_yS_z$, $0<x<3$, $0<y<3$, $0<z<7$), such as $LiI-Li_2S-P_2S_5$, or a mixture thereof.

In addition, there is no particular limitation in the average particle diameter of the inorganic particles. However, the inorganic particles preferably have an average particle diameter of 0.1-1.5 μm with a view to formation of a coating layer with a uniform thickness and suitable porosity. When the average particle diameter is smaller than 0.1 μm, dispersibility may be degraded. When the average particle diameter is larger than 1.5 μm, the resultant coating layer may have an increased thickness.

Hereinafter, the method for manufacturing the separator according to the present disclosure will be explained. The separator according to the present disclosure may be obtained by applying a composition for forming a porous coating layer to the surface of a porous substrate, followed by drying, thereby coating a porous coating layer on the surface of a porous substrate.

First, a binder resin is dissolved in a solvent to prepare a polymer solution. Next, inorganic particles are introduced to the polymer solution, followed by mixing, to prepare a composition for forming a porous coating layer. Then, the composition is applied to the surface of a porous substrate, followed by drying.

The application method is not particularly limited and any method used conventionally in the art, such as coating, lamination, coextrusion, or the like, may be used. Non-limiting examples of the coating process include a dip coating process, die coating process, roll coating process or comma coating process. Such coating processes may be used alone or in combination. For example, the porous coating layer of the separator according to the present disclosure may be formed through a dip coating process.

Reference will be made to the above description about the ingredients contained in the composition and contents thereof. The solvent is not particularly limited, as long as it can dissolve the acrylic copolymer. Non-limiting examples of the solvent that may be used herein include acetone, dimethyl formamide, dimethyl sulfoxide, dimethyl acetamide, dimethyl carbonate, N-methyl pyrrolidone or cyclohexane. The solvent may be used in an amount of 20-99 wt %, particularly 50-95 wt %, and more particularly 70-95 wt %, based on the weight of the composition. When the solvent is used in the above-defined range, it is possible to prepare the composition for forming a porous coating layer with ease and to facilitate drying of the porous coating layer.

Meanwhile, according to an embodiment of the present disclosure, the composition for forming a porous coating layer may be dried under a humidified condition with a relative humidity of 35-55%. When the porous coating layer includes a PVdF-based copolymer as a non-crosslinkable binder resin, such drying under a humidified condition accelerates migration of the PVdF-based copolymer toward the surface. In this manner, an adhesive portion having a relatively higher content of PVdF-based copolymer may be formed on the surface portion of the porous coating layer. When the porous coating layer is provided with the adhesive portion in the above-mentioned manner, it is possible to increase the binding force between an electrode and the separator.

Then, the dried product may be subjected to chemical crosslinking through thermal polymerization or UV irradiation. For example, the crosslinking may be carried out by thermal crosslinking, photocuring, or high-humidity high-temperature curing. The photocuring reaction may include drying the separator in an oven at 50-120° C. for about 10-60 seconds, and irradiating UV rays thereto for about 5-100 seconds, such as about 5-20 seconds. The thermal curing reaction may include subjecting the separator to thermal curing at 25-100° C. for 1 minute to 10 days, particularly at 25-80° C. for 1 minute to 7 days, and more particularly at 40-80° C. for 1-3 days. The high-humidity high-temperature curing reaction may include curing the separator under a relative humidity of 10-80% at a temperature of 60-110° C. for 1-60 minutes, particularly 5-30 minutes.

Meanwhile, the present disclosure provides a secondary battery including the separator. The battery includes a negative electrode, a positive electrode and a separator interposed between the negative electrode and the positive electrode, wherein the separator is provided with the above-described coating layer.

According to the present disclosure, the positive electrode includes a positive electrode current collector and a positive electrode active material layer formed on at least one surface of the current collector and containing a positive electrode active material, a conductive material and a binder resin. The positive electrode active material may include any one selected from: layered compounds, such as lithium manganese composite oxide ($LiMn_2O_4$, $LiMnO_2$, etc.), lithium cobalt oxide ($LiCoO_2$) and lithium nickel oxide ($LiNiO_2$), or those compounds substituted with one or more transition metals; lithium manganese oxides such as those represented by the chemical formula of $Li_{1+x}Mn_{2-x}O_4$ (wherein x is 0-0.33), $LiMnO_3$, $LiMn_2O_3$ and $LiMnO_2$; lithium copper oxide ($Li_2CuO_2$); vanadium oxides such as $LiV_3O_8$, $LiV_3O_4$, $V_2O_5$ or $Cu_2V_2O_7$; Ni-site type lithium nickel oxides represented by the chemical formula of $LiNi_{1-x}M_xO_2$ (wherein M is Co, Mn, Al, Cu, Fe, Mg, B or Ga, and x is 0.01-0.3); lithium manganese composite oxides represented by the chemical formula of $LiMn_{2-x}M_xO_2$ (wherein M=Co, Ni, Fe, Cr, Zn or Ta, and x=0.01-0.1) or $Li_2Mn_3MO_8$ (wherein M=Fe, Co, Ni, Cu or Zn); $LiMn_2O_4$ in which Li is partially substituted with an alkaline earth metal ion; disulfide compounds; and $Fe_2(MoO_4)_3$; or a mixture of two or more of them.

According to the present disclosure, the negative electrode includes a negative electrode current collector, and a negative electrode active material layer formed on at least one surface of the current collector and containing a negative electrode active material, a conductive material and a binder resin. The negative electrode may include, as a negative electrode active material, any one selected from: lithium metal oxide; carbon such as non-graphitizable carbon or graphite-based carbon; metal composite oxides, such as $Li_xFe_2O_3$ ($0 \leq x \leq 1$), $Li_xWO_2$ ($0 \leq x \leq 1$), $Sn_xMe_{1-x}Me'_yO_z$ (Me: Mn, Fe, Pb, Ge; Me': Al, B, P, Si, elements of Group 1, 2 or 3 in the Periodic Table, halogen; $0 < x \leq 1$; $1 \leq y \leq 3$; $1 \leq z \leq 8$); lithium metal; lithium alloy; silicon-based alloy; tin-based alloy; metal oxides, such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$ and $Bi_2O_5$; conductive polymers, such as polyacetylene; Li—Co—Ni type materials; and titanium oxide; or a mixture of two or more of them.

According to an embodiment of the present disclosure, the conductive material may be any one selected from the group consisting of graphite, carbon black, carbon fibers or metal fibers, metal powder, conductive whiskers, conductive metal oxides, activated carbon and polyphenylene derivatives, or a mixture of two or more of such conductive materials. More particularly, the conductive material may be any one selected from natural graphite, artificial graphite, Super-P, acetylene black, Ketjen black, channel black, furnace black, lamp black, thermal black, denka black, aluminum powder, nickel powder, zinc oxide, potassium titanate and titanium dioxide, or a mixture of two or more such conductive materials.

The current collector is not particularly limited, as long as it causes no chemical change in the corresponding battery and has high conductivity. Particular examples of the current collector may include stainless steel, copper, aluminum, nickel, titanium, baked carbon, aluminum or stainless steel surface-treated with carbon, nickel, titanium or silver, or the like.

The binder resin may be a polymer used currently for an electrode in the art. Non-limiting examples of the binder resin include, but are not limited to: polyvinylidene fluoride-co-hexafluoropropylene, polyvinylidene fluoride-co-trichloroethylene, polymethyl methacrylate, polyethylhexyl acrylate, polybutyl acrylate, polyacrylonitrile, polyvinyl pyrrolidone, polyvinyl acetate, polyethylene-co-vinyl acetate, polyethylene oxide, polyarylate, cellulose acetate, cellulose acetate butyrate, cellulose acetate propionate, cyanoethylpullulan, cyanoethylpolyvinyl alcohol, cyanoethyl cellulose, cyanoethyl sucrose, pullulan, and carboxymethyl cellulose.

The electrode assembly prepared as described above may be introduced to a suitable casing and an electrolyte may be injected thereto to obtain a battery.

According to the present disclosure, the electrolyte is a salt having a structure of $A^+B^-$, wherein $A^+$ includes an alkali metal cation such as $Li^+$, $Na^+$, $K^+$ or a combination thereof, and $B^-$ includes an anion such as $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$, $C(CF_2SO_2)_3^-$ or a combination thereof, the salt being dissolved or dissociated in an organic solvent selected from propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethyl methyl carbonate (EMC), gamma-butyrolactone (γ-butyrolactone), ester compounds and mixtures thereof. However, the present disclosure is not limited thereto.

Meanwhile, according to an embodiment of the present disclosure, the organic solvent includes an ester compound. Preferably, the ester compound may be used in an amount of 30 wt % or more, 50 wt % or more, 60 wt % or more, or 65 wt % or more, based on 100 wt % of the organic solvent.

According to an embodiment of the present disclosure, the ester compound includes at least one selected from the group consisting of isobutyl propionate, isoamyl propionate, isobutyl butyrate, isopropyl propionate, methyl propionate, ethyl propionate, propyl propionate, butyl propionate, methyl acetate, ethyl acetate, propyl acetate, butyl acetate, methyl butyrate, ethyl butyrate, propyl butyrate and butyl butyrate.

When using such an ester compound, it is possible to realize high ion conductivity, thereby providing an advantage in terms of application to a secondary battery for high-output vehicles. However, in the case of an ester compound, electrolyte absorption to a PVdF-based copolymer binder resin, such as PVdF-HFP, is high so that the porosity of the porous coating layer may be decreased. However, as described above, the separator according to the present disclosure includes PVdF-TrFE and/or PVdF-TFE as a binder resin for the porous coating layer, and PVdF-TrFE and PVdF-TFE can maintain an absorption of 30% or less to an ester compound. Therefore, when using PVdF-TrFE and/or PVdF-TFE as a binder resin for the porous coating layer and an ester compound is used as an electrolyte, it is possible to maximize ion conductivity characteristics, and thus provides a significant advantage in manufacturing a battery for high-output devices, such as electric vehicles.

In addition, the present disclosure provides a battery module which includes a battery including the electrode assembly as a unit cell, a battery pack including the battery module, and a device including the battery pack as an electric power source. Particular examples of the device include, but are not limited to: power tools driven by the power of an electric motor; electric cars, including electric vehicles (EV), hybrid electric vehicles (HEV), plug-in hybrid electric vehicles (PHEV), or the like; electric two-wheeled vehicles, including E-bikes and E-scooters; electric golf carts; electric power storage systems; or the like.

Examples will be described more fully hereinafter so that the present disclosure can be understood with ease. The following examples may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art.

Manufacture of Separator

Examples 1-3

First, a binder resin, crosslinking agent and acid were added to acetone and dissolved therein at 50° C. for about 12 hours to prepare a polymer solution. The binder resin had a concentration of 10 wt % in the polymer solution. The content (weight ratio basis) of binder resin and that of acid are shown in the following Table 1. In addition, the crosslinking agent was mixed at a ratio of 5 parts by weight based on 100 parts by weight of the crosslinkable acrylic binder resin. Next, alumina (diameter 500 nm) was prepared as inorganic particles, and added to and dispersed in the polymer solution at a weight ratio of binder resin/inorganic particles of 10/90, thereby providing a composition for forming a porous coating layer. The prepared composition was applied to a porous substrate made of polyethylene and having a thickness of 12 μm and a porosity of 30% through a dip coating process, followed by drying. The drying was carried out under environment controlled to a relative humidity of 40-45%. Then, a crosslinking process was carried out. The crosslinking process was carried out at 60° C. for 12 hours. The porous coating layer was loaded in an amount of about 10 g/m² on one surface.

Comparative Examples 1-3

Each composition for forming a porous coating layer was prepared according to the ingredients and contents (weight ratio basis) as shown in Table 1. The prepared composition was applied to a porous substrate made of polyethylene and having a thickness of 12 μm and a porosity of 30% through a dip coating process, followed by drying. The drying was carried out under environment controlled to a relative humidity of 40-45%. Then, in Comparative Examples 2 and 3, a crosslinking process was carried out after the drying process. The crosslinking process was carried out in the same manner as Examples 1-3. The porous coating layer was loaded in an amount of about 10 g/m² on one surface.

Comparative Example 4

A composition for forming a porous coating layer was prepared according to the ingredients and contents (weight ratio basis) as shown in Table 1. In the case of Comparative Example 4, the composition showed a sedimentation rate of 188.8 μm/s and had low phase stability due to such a high sedimentation rate, and thus no coating layer could be formed.

TABLE 1

| | (Weight ratio basis) | | | |
|---|---|---|---|---|
| | Binder resin | | | |
| | PVdF-HFP (molecular weight 500,000, HFP content 15 wt %) | Crosslinkable acrylic copolymer (copolymer of 2HEA, BA and IBOA) molecular weight 500,000, OH content 15 wt %) | Tannic acid (Withchem, molecular weight 1700, C76H52O45, OH content 91 wt %) | Isocyanate (trifunctional isocyanate, Asahi Kasei chemicals, TKA-100, molecular weight 138, NCO content 21%) |
| Ex. 1 | 15 | 4 | 1 | Used |
| Ex. 2 | 15 | 3 | 2 | Used |
| Ex. 3 | 15 | 2.5 | 2.5 | Used |
| Comp. Ex. 1 | 20 | 0 | 0 | Not used |
| Comp. Ex. 2 | 15 | 5 | 0 | Used |
| Comp. Ex. 3 | 15 | 0 | 3 | Not used |
| Comp. Ex. 4 | 15 | 0 | 5 | Not used |

*2HEA: 2-hydroxyethylacrylate
*BA: Butyl acylate
*IBOA: Isobornyl acrylate

Determination of Peel Strength

Each of the separators obtained from Examples 1-3 and Comparative Examples 1-3 was cut into a size of 15 mm×100 mm. A double-sided adhesive tape was adhered to a glass plate and the porous coating layer surface of each separator was attached to the adhesive tape. Then, the end portion of the attached separator was mounted to a UTM instrument (LLOYD Instrument, LF plus) and force was applied thereto at a rate of 300 mm/min with an angle of 180°, and the force required to separate the porous coating layer from the porous substrate was measured. The results are shown in the following Table 2.

Determination of Heat Shrinkage

Each of the separators obtained from Examples 1-3 and Comparative Examples 1-3 was determined in terms of heat shrinkage. Each separator was cut into a size of 50 mm×50 mm and allowed to stand at 150° C. for 30 minutes. Then, heat shrinkage was calculated according to the above Formula 1. The results are shown in the following Table 2. In the case of each of Examples 1-3, each separator shows a heat shrinkage similar to the heat shrinkage of each of Comparative Examples 1-3, before crosslinking. However, each of the separators according to Examples 1-3 shows a significantly reduced heat shrinkage after crosslinking, as compared to Comparative Examples 1-3.

Determination of Sedimentation Rate

The composition for forming a porous coating layer according to each of Examples 1-3 and Comparative Examples 1-4 was determined in terms of sedimentation rate. Lumisizer (LUM10) was used to determine the sedimentation rate of slurry through centrifugal separation without dilution of slurry. As the sedimentation rate is increased, inorganic particles are precipitated at a higher rate, suggesting that the composition shows lower phase stability. In Table 2, the sedimentation rate of each composition is shown. In the case of Comparative Example 4, it showed an excessively high sedimentation rate and low phase stability, and thus no porous coating layer could be formed. Introduction of an acid causes adsorption of the acid to the inorganic material, resulting in an increase in adhesion. However, in the case of Comparative Example 4, it seems that introduction of an excessive amount of acid causes aggregation of inorganic material particles.

TABLE 2

| | Sedimentation rate (μm/s) | Thickness of separator (μm) | Peel strength (gf/15 mm) | Heat shrinkage (%) | |
|---|---|---|---|---|---|
| | | | | Before crosslinking | After crosslinking |
| Ex. 1 | 13.16 | 16 | 123 | 49 | 12 |
| Ex. 2 | 13.84 | 16.3 | 156 | 52 | 10 |
| Ex. 3 | 15.26 | 16.5 | 187 | 55 | 8 |
| Comp. Ex. 1 | 12.75 | 16.1 | 180 | 53 | — |
| Comp. Ex. 2 | 13.78 | 16.2 | 65 | 50 | 25 |
| Comp. Ex. 3 | 51.4 | 16.2 | 200 | 65 | 40 |
| Comp. Ex. 4 | 188.8 | — | — | — | — |

As can be seen from Table 2, each of the separators according to Comparative Examples 1 and 3 shows a higher heat shrinkage as compared to the separators according to Examples 1-3. In the case of Comparative Example 2, it shows worse results of peel strength and heat shrinkage to the separators according to Examples 1-3. In the contrary, it is shown that the separators according to Examples 1-3 have excellent heat shrinkage and peel strength.

What is claimed is:

1. A method for manufacturing a separator for an electrochemical device, comprising the steps of:
   (S1) preparing a porous substrate;
   (S2) preparing a composition for forming a porous coating layer;
   (S3) coating the composition for forming a porous coating layer onto at least one surface of the porous substrate to produce a coated porous substrate; and
   (S4) introducing the coated porous substrate obtained from step (S3) to a crosslinking process,
   wherein the composition for forming the porous coating layer comprises a crosslinkable binder resin, a non-crosslinkable binder resin, a crosslinking agent and an acid, and
   wherein the acid is present in an amount of 16 wt % to 60 wt % based on 100 wt % of a mixture of the crosslinkable binder resin with the acid.

2. The method for manufacturing the separator for the electrochemical device according to claim 1, wherein the crosslinkable binder resin comprises a repeating unit derived from an acrylate monomer having a crosslinkable functional group.

3. The method for manufacturing the separator for the electrochemical device according to claim 2, wherein the crosslinkable functional group comprises at least one of a hydroxyl (OH) group, or carboxyl group.

4. The method for manufacturing the separator for the electrochemical device according to claim 2, wherein the repeating unit comprises at least one of 2-hydroxyethyl (meth) acrylate, 3-hydroxypropyl(meth) acrylate, 4-hydroxybutyl(meth) acrylate, 2-hydroxyethylene glycol(meth) acrylate, or 3-hydroxypropylene glycol(meth) acrylate.

5. The method for manufacturing the separator for the electrochemical device according to claim 1, wherein the non-crosslinkable binder resin comprises a PVdF-based copolymer comprising a repeating unit derived from vinylidene fluoride monomer.

6. The method for manufacturing the separator for the electrochemical device according to claim 1, wherein the acid has a molecular weight (Mw) of 1,000 g/mol to 10,000 g/mol, and an OH content of 25 wt % or more.

7. The method for manufacturing the separator for the electrochemical device according to claim 1, wherein a content of the crosslinkable binder resin is 10 wt % to 30 wt % based on 100 wt % of total binder resin present in the composition for forming the porous coating layer.

8. The method for manufacturing the separator for the electrochemical device according to claim 1, wherein the crosslinking agent comprises an isocyanate-based crosslinking agent.

9. A separator for an electrochemical device obtained by the method as defined in claim 1,
   wherein the separator for the electrochemical device comprises the porous substrate and the porous coating layer formed on at least one surface of the porous substrate,
   wherein the porous coating layer comprises inorganic particles, the crosslinkable binder resin and the non-crosslinkable binder resin,
   wherein the crosslinkable binder resin is maintained in a state crosslinked by a crosslinking agent, and the crosslinking agent is bound to an acid.

10. The separator for the electrochemical device according to claim 9, wherein the acid forms hydrogen bonds with at least one of the inorganic particles or the porous substrate.

11. The separator for the electrochemical device according to claim 9, wherein the acid has a molecular weight (Mw) of 1,000 g/mol to 10,000 g/mol, and an OH content of 25 wt % or more.

12. An electrochemical device comprising:
   a negative electrode;
   a positive electrode; and
   a separator interposed between the positive electrode and the negative electrode,
   wherein the separator is the separator for the electrochemical device as defined in claim 9.

* * * * *